March 26, 1940.  C. W. METZGAR  2,194,710
LUBRICATING DEVICE
Filed Dec. 22, 1938  2 Sheets-Sheet 1

INVENTOR
Chester W. Metzgar
BY
HIS ATTORNEY

March 26, 1940. C. W. METZGAR 2,194,710
LUBRICATING DEVICE
Filed Dec. 22, 1938 2 Sheets-Sheet 2

INVENTOR
Chester W. Metzgar
BY
HIS ATTORNEY

Patented Mar. 26, 1940

2,194,710

UNITED STATES PATENT OFFICE 2,194,710

LUBRICATING DEVICE

Chester W. Metzgar, Easton, Pa., assignor to Ingersoll-Rand Company, Jersey City, N. J., a corporation of New Jersey Application December 22, 1938, Serial No. 247,206

5 Claims. (Cl. 184—6)

This invention relates to lubricating devices, and more particularly to a lubricating device for reciprocatory compressors.

One object of the invention is to assure an immediate supply of lubricant to the compressor bearings at the beginning of an operating period of the compressor.

Another object is to vary the supply of lubricant to the compressor bearings in accordance with variations in the speed of the compressor.

Other objects will be in part obvious and in part pointed out hereinafter.

Figure 2:
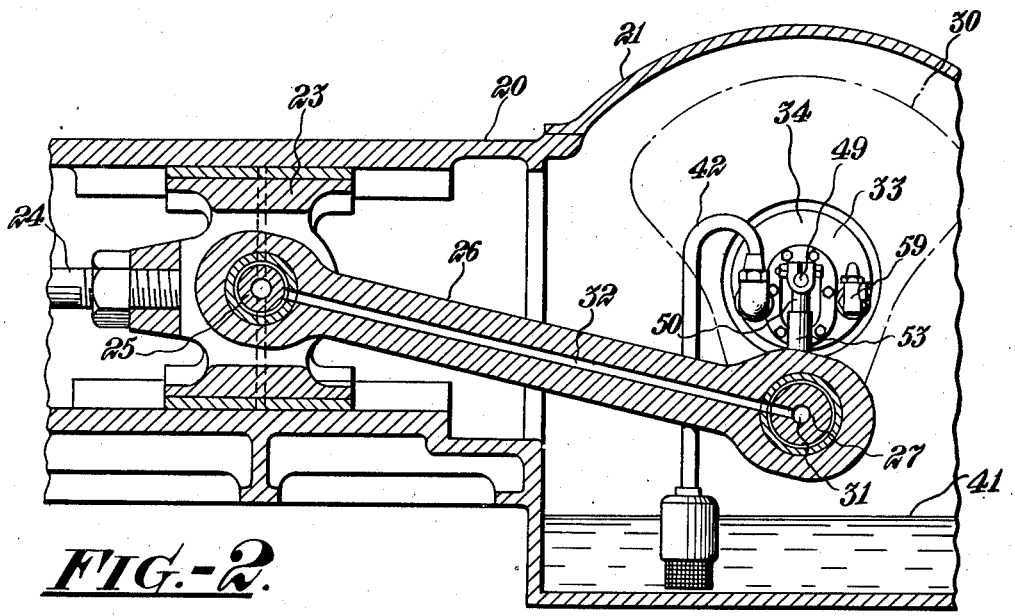
Figure 1:
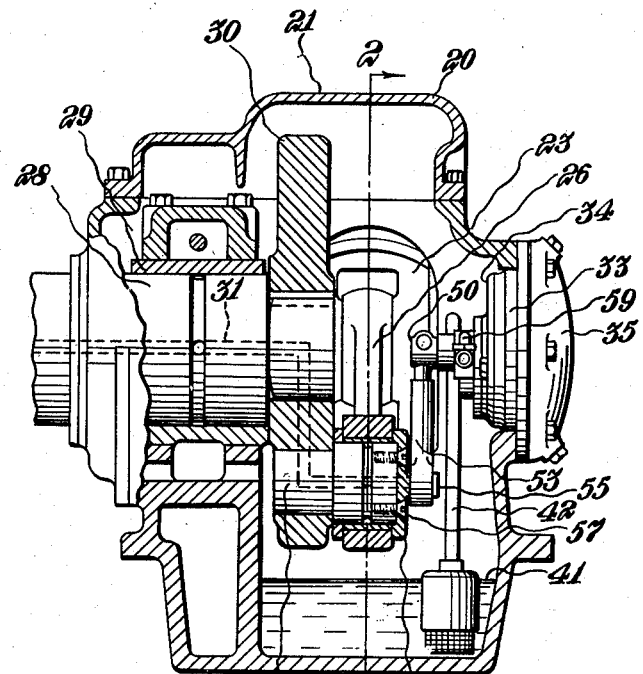
Figure 3:
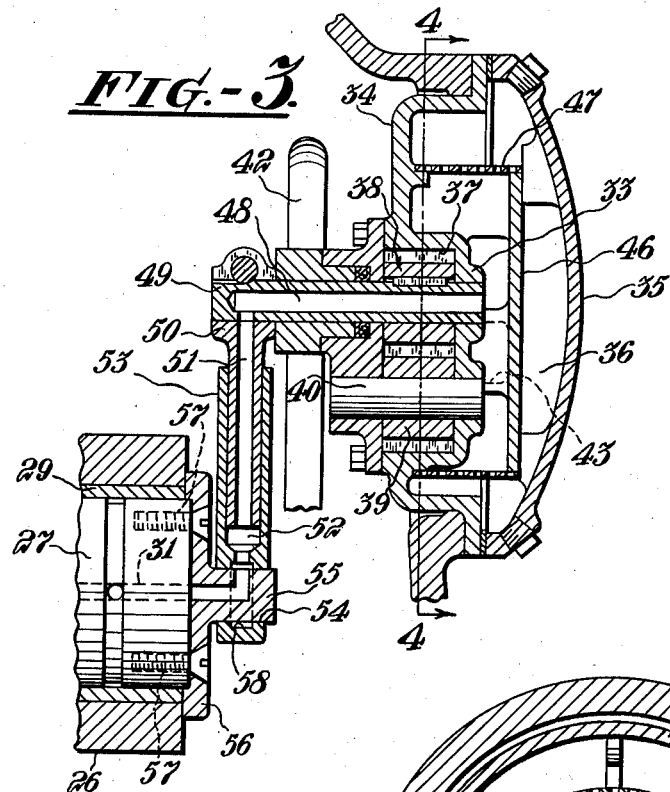
Figure 4:
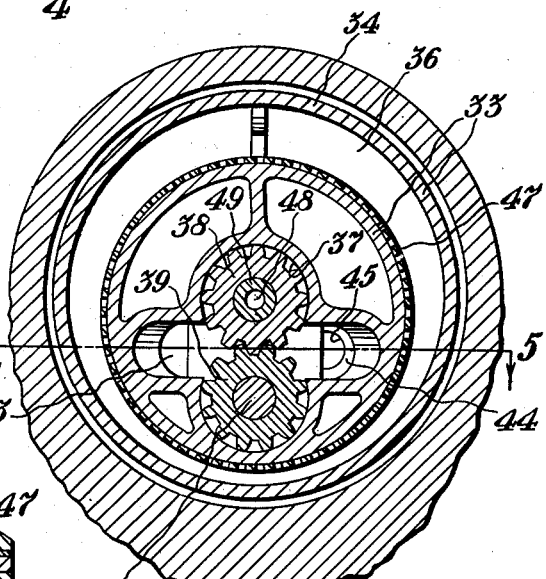
Figure 5:
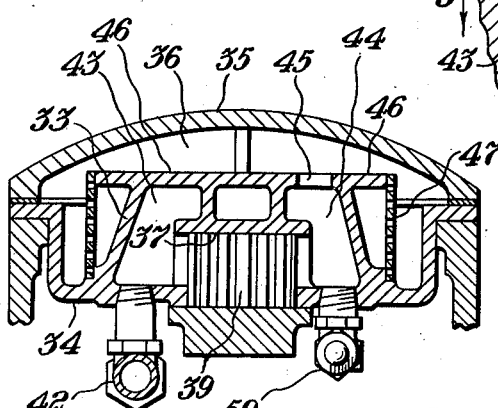

In the accompanying drawings and in which similar reference numerals refer to similar parts, Figure 1 is a transverse view in elevation, partly in section, of a compressor equipped with a lubricating device constructed in accordance with the practice of the invention, Figure 2 is a longitudinal elevation, partly in section, taken through Figure 1 on the line 2—2, Figure 3 is an enlarged view, partly in section, of the lubricating pump and a portion of the crank shaft whereby the pump is driven, Figure 4 is a transverse view taken through Figure 3 on the line 4—4, and Figure 5 is a view taken through Figure 4 on the line 5—5.

Referring more particularly to the drawings, 20 designates a compressor comprising the usual casing 21 of which a portion serves as a guide for a crosshead 23 which may be connected, in a well known manner, to a piston (not shown) by a rod 24.

The crosshead 23 carries a pin 25 that extends through an end of a connecting rod 26, the other end of which is connected to a pin 27 of a crank shaft 28. The crank shaft 28 is supported, in the present instance, by a single bearing 29 and has a crank web 30 keyed thereto to carry the crank pin 27.

The crank shaft 28 and the connecting rod 26 have passages 31 and 32, respectively, in communication with each other for conveying lubricant to the bearing portions of the crank shaft and the connecting rod. The lubricant is supplied to the passages under pressure by a pump designated, in general, by 33 and driven by the crank shaft 28.

The pump 33 is arranged in the wall of the casing 21, preferably coaxially with the crank shaft 28, and comprises a casing 34 which may be secured to the casing 21 in any suitable manner as may also be the cover 35 which overlies the upper portion of the casing 34 and cooperates therewith to define a chamber 36 to receive the lubricant discharged by the pump.

Within the casing 34 is a pumping chamber 37 containing a pair of inter-meshing gears 38 and 39 which constitute the pumping element. The gear 38 is the driving gear and the gear 39 the driven gear which is mounted upon a stationary shaft 40 in the casing 34. The lubricant, such as oil 41, is drawn from the bottom of the casing 21 by the gears 38 and 39 through an intake conduit 42 attached to the casing 34 and opening into an inlet chamber 43 in the casing 34. The inlet chamber 43 lies on one side of the pumping chamber 37 and on the opposite side of the pumping chamber 37 is a discharge chamber 44 into which the oil conveyed by the gears 38 and 39 is delivered, whence it passes into the chamber 36 through a port 45 in a wall 46 constituting the outermost end of the casing 34.

The wall 46 is preferably of annular shape and its periphery acts as a seat for a screen 47 serving to screen the oil passing from the chamber 36 into the space between the wall 46 and the innermost wall of the casing 34.

An outlet for the oil passing through the screen 47 is provided by a passage 48 in a shaft 49 upon which the gear 38 is mounted. The shaft 49 extends exteriorly of the casing 34 and has secured to its free end an arm 50 which may be affixed to the shaft in any suitable manner to prevent relative rotary movement therebetween. The arm 50 is hollow, having a passage 51 that communicates with the passage 48 and opens into a bore 52 in a rod 53 telescopically engaging the rod 50.

The rod 53 has a nice sliding fit on the rod 50 to assure a fluid tight seal and has a transverse bore 54 in an end thereof to receive, rotatively, a projection 55 carried by a cap 56 secured to the end of the crank pin 27 by screws 57. The rod 53 has a free sliding movement on the projection 55 and in the wall of the bore 54 is an annular groove 58 to afford communication between the bore 52 and the passage 31, in the crank shaft, which also extends through the projection 55.

Preferably, a relief valve 59 is attached to the casing 34 to communicate with the discharge chamber 44 for preventing excessive pressure values therein.

In the operation of the device, the oil pumped by the gears 38 and 39 is discharged through the chamber 44 and the port 45 into the chamber 36.

After passing through the screen 47 the oil flows through the passage 48 and the rods 50 and 53 to the passages 31 and 32 for lubricating the bearing surfaces of the crank shaft and the connecting rod and, of course, such other portions of the compressor requiring lubrication, as for example the crosshead ways and for which purpose suitable oil passages may be provided.

Inasmuch as the gears of the oil pump are connected to be driven by the crank shaft an ample supply of oil will be delivered to the bearings of the compressor immediately at the beginning of an operating period. The oil supply to the bearings will also be fully commensurate with their requirements since any variations in the speed of the compressor will have the effect of varying the volume of oil supplied to its bearings.

A further highly desirable feature of the present invention is that by reason of the telescopic driving connection between the crank shaft and the pump this connection will be self-adjusting to compensate for any slight error in the positioning of the pump with respect to the crank shaft. Although it is preferred that the driven shaft 49 of the pump be coaxial with the crank shaft it will be readily understood that in the event that the two are slightly off-set with respect to each other such misalignment will not have an adverse effect upon the pump since the rod 53 is freely slidable upon the rod 50. This connection may, therefore, adjust itself freely accordingly as the distance between the projection 55 and the shaft 49 may vary.

I claim:

1. In a lubricating device, the combination of a casing and a crank shaft, a crank pin on the crank shaft, a rotary pump for pumping lubricant to lubricate the crank shaft and being disposed coaxially therewith, and a telescopic driving connection between the crank pin and the rotor of the pump.

2. In a lubricating device, the combination of a casing and a crank shaft having a passage, a rotary pump to pump lubricant and having a passage in its rotor to convey discharge lubricant from the pump, and a driving connection connecting the crank pin to the rotor of the pump and forming a conduit to establish communication between the passages.

3. In a lubricating device, the combination of a casing and a crank shaft having a passage, a rotary pump to pump lubricant and having a passage in its rotor to convey discharge lubricant from the pump, a rod affixed to the rotor of the pump, a rod on the crank pin in telescopic engagement with the first said rod for driving the pump, and said rods forming conduits to afford communication between the said passages.

4. In a lubricating device, the combination of a casing and a crank shaft having a passage, a rotary pump coaxial with the crank shaft to pump lubricant and having a passage in its rotor, and a telescopic driving connection to transmit motion from the crank shaft to the pump and to afford communication between the passages.

5. In a lubricating device, the combination of a casing and a crank shaft having a passage, a crank pin on the crank shaft having a passage communicating with the crank shaft passage, a rotary pump to pump lubricant disposed in the casing coaxial with the shaft, a rotor in the pump having a passage to convey discharge lubricant from the pump, a rod affixed to the rotor of the pump, and a rod on the crank pin in telescopic engagement with the first said rod for driving the pump, said rods forming conduits to afford communication between a rotor passage and the crank pin passage.

CHESTER W. METZGAR.